(12) United States Patent
Lu

(10) Patent No.: US 9,595,209 B2
(45) Date of Patent: Mar. 14, 2017

(54) NAVIGATION SYSTEM WITH MAP MATCHING MECHANISM AND METHOD OF OPERATION THEREOF

(75) Inventor: Chunhua Lu, Beijing (CN)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 13/324,533

(22) Filed: Dec. 13, 2011

(65) Prior Publication Data

US 2013/0151138 A1 Jun. 13, 2013

(51) Int. Cl.
*G09B 29/00* (2006.01)
*G09B 29/10* (2006.01)
*G01C 21/30* (2006.01)

(52) U.S. Cl.
CPC .......... *G09B 29/106* (2013.01); *G01C 21/30* (2013.01)

(58) Field of Classification Search
CPC ....... G09B 29/106; G01C 21/30; G01C 21/34
USPC ..... 701/117, 410, 426, 450, 533, 1, 519, 26;
345/419, 440, 474; 715/230, 734, 738,
715/762, 788, 810, 853, 854; 700/246;
716/130
See application file for complete search history.

(56) References Cited

U.S. PATENT DOCUMENTS

| | | | |
|---|---|---|---|
| 2005/0049783 A1* | 3/2005 | Hunzinger | 701/208 |
| 2005/0099323 A1* | 5/2005 | Hirose | 340/995.13 |
| 2007/0275700 A1* | 11/2007 | Agrawal et al. | 455/414.1 |
| 2009/0222737 A1* | 9/2009 | Liesche et al. | 715/738 |
| 2010/0312386 A1* | 12/2010 | Chrysanthakopoulos et al. | 700/246 |
| 2011/0064077 A1 | 3/2011 | Wen | |
| 2012/0023141 A1* | 1/2012 | Holster | 707/798 |
| 2012/0232788 A1* | 9/2012 | Diao | 701/426 |

OTHER PUBLICATIONS

Calisi et al., "Autonomous Navigation and Exploration in a Rescue Environment", Proceedings of the 2005 IEEE Kobe, Japan, Jun. 2005; pp. 54-59 attachment: Calisi_Autonomous Navigation_2005.*
Freeman, "Topological Tree Clustering of Social Network Search Results", Dec. 16-19, 2007, p. 7, Publisher: Proceedings of the Eight International Conference on Intelligent Data Engineering and Automated Learning (IDEAL'07).
Quddus, "High Integrity Map Matching Algorithms for Advanced Transport Telematics Applications", Jan. 2006, pp. 91-110, Publisher: Imperial College London, Centre for Transport Studies, Department of Civil and Environmental Engineering, Published in: London, United Kingdom.
Saleh et al., "Map Matching to Improve the Accuracy of Objects Allocation on Maps", 2009, p. 5, Publisher: Survey Paper—Classification Study.

* cited by examiner

*Primary Examiner* — Jelani Smith
(74) *Attorney, Agent, or Firm* — IP Investment Law Group

(57) ABSTRACT

A method of operation of a navigation system includes: receiving a current position for locating a device; adding a new edge from a road topology map to a topological tree based on the current position; removing an old edge from the topological tree based on the current position; determining a matched edge of the topological tree based on the current position and the topological tree; and calculating an adjusted location based on the matched edge for displaying on the device.

20 Claims, 8 Drawing Sheets

NAVIGATION SYSTEM WITH MAP MATCHING MECHANISM AND METHOD OF OPERATION THEREOF

TECHNICAL FIELD

The present invention relates generally to a navigation system, and more particularly to a navigation system with map matching mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information. However, the accuracy of the location based routing systems continues to challenge commercial applicability of these systems.

Thus, a need still remains for a navigation system with map matching mechanism to identify the true location of a mobile device. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a current position for locating a device; adding a new edge from a road topology map to a topological tree based on the current position; removing an old edge from the topological tree based on the current position; determining a matched edge of the topological tree based on the current position and the topological tree; and calculating an adjusted location based on the matched edge for displaying on the device.

The present invention provides a navigation system including: a position module for receiving a current position for locating a device; an expand module, coupled to the position module, for adding a new edge from a road topology map to a topological tree based on the current position; a remove module, coupled to the expand module, for removing an old edge from the topological tree based on the current position; a match module, coupled to the remove module, for determining a matched edge of the topological tree based on the current position and the topological tree; and a display module, coupled to the match module, for calculating an adjusted location based on the matched edge for displaying on the device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
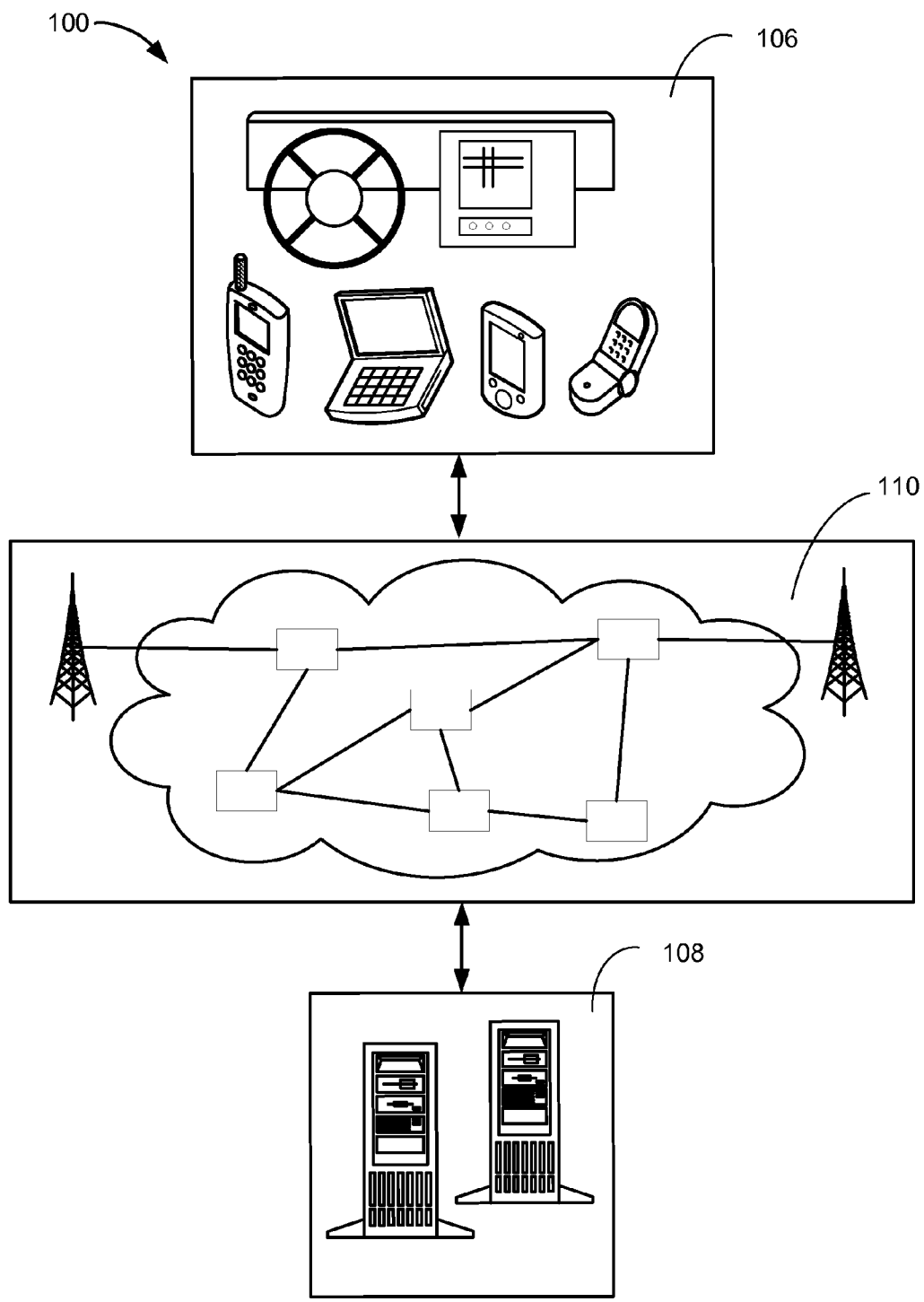
FIG. 1 is a navigation system with map matching mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system with map matching mechanism 100 in an embodiment of the present invention. The navigation system 100 includes a first device 106, such as a client or a server, connected to a second device 108, such as a client or server, with a communication path 110, such as a wireless or wired network.

For example, the first device 106 can be of any of a variety of mobile devices, such as a cellular phone, personal digital assistant, a notebook computer, automotive telematic navigation system, or other multi-functional mobile communication or entertainment device. The first device 106 can be a standalone device, or can be incorporated with a vehicle, for example a car, truck, bus, or train. The first device 106 can couple to the communication path 110 to communicate with the second device 108.

For illustrative purposes, the navigation system 100 is described with the first device 106 as a mobile computing device, although it is understood that the first device 106 can be different types of computing devices. For example, the first device 106 can also be a non-mobile computing device, such as a server, a server farm, or a desktop computer.

The second device 108 can be any of a variety of centralized or decentralized computing devices. For example, the second device 108 can be a computer, grid computing resources, a virtualized computer resource, cloud computing resource, routers, switches, peer-to-peer distributed computing devices, or a combination thereof.

The second device 108 can be centralized in a single computer room, distributed across different rooms, distributed across different geographical locations, embedded within a telecommunications network. The second device 108 can have a means for coupling with the communication path 110 to communicate with the first device 106. The second device 108 can also be a client type device as described for the first device 106.

In another example, the first device 106 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 108 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 108 as a non-mobile computing device, although it is understood that the second device 108 can be different types of computing devices. For example, the second device 108 can also be a mobile computing device, such as notebook computer, another client device, or a different type of client device. The second device 108 can be a standalone device, or can be incorporated with a vehicle, for example a car, truck, bus, or train.

Also for illustrative purposes, the navigation system 100 is shown with the second device 108 and the first device 106 as end points of the communication path 110, although it is understood that the navigation system 100 can have a different partition between the first device 106, the second device 108, and the communication path 110. For example, the first device 106, the second device 108, or a combination thereof can also function as part of the communication path 110.

The communication path 110 can be a variety of networks. For example, the communication path 110 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 110. Ethernet, digital subscriber line (DSL), fiber to the home (FTTH), and plain old telephone service (POTS) are examples of wired communication that can be included in the communication path 110.

Further, the communication path 110 can traverse a number of network topologies and distances. For example, the communication path 110 can include direct connection, personal area network (PAN), local area network (LAN), metropolitan area network (MAN), wide area network (WAN) or any combination thereof.

Figure 2:
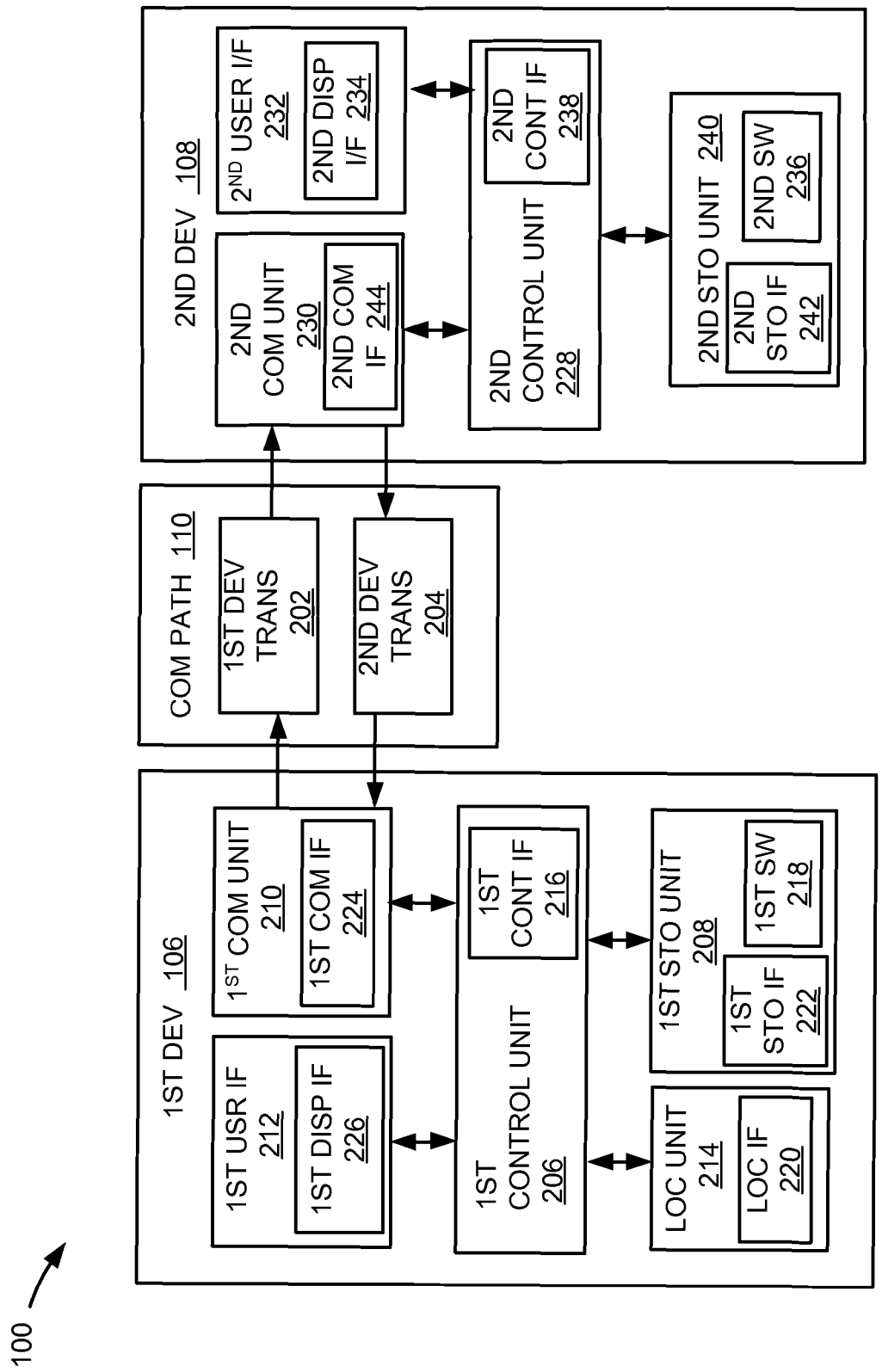
FIG. 2 is an exemplary block diagram of the navigation system of FIG. 1.

Referring now to FIG. 2, therein is shown an exemplary block diagram of the navigation system 100 of FIG. 1. The navigation system 100 can include the first device 106, the communication path 110, and the second device 108. The first device 106 can send information in a first device transmission 202 over the communication path 110 to the second device 108. The second device 108 can send information in a second device transmission 204 over the communication path 110 to the first device 106.

For illustrative purposes, the navigation system 100 is shown with the first device 106 as a client device, although it is understood that the navigation system 100 can have the first device 106 as a different type of device. For example, the first device 106 can be a server.

Also for illustrative purposes, the navigation system 100 is shown with the second device 108 as a server, although it is understood that the navigation system 100 can have the second device 108 as a different type of device. For example, the second device 108 can be a client device.

For brevity of description in this embodiment of the present invention, the first device 106 will be described as a client device and the second device 108 will be described as a server device. The present invention is not limited to this selection for the type of devices. The selection is an example of the present invention.

The first device 106 can include a first control unit 206, a first storage unit 208, a first communication unit 210, a first user interface 212, and a location unit 214. The first control unit 206 can include a first control interface 216. The first control unit 206 can execute a first software 218 to provide the intelligence of the navigation system 100. The first control unit 206 can be implemented in a number of different manners. For example, the first control unit 206 can be a processor, an embedded processor, a microprocessor, a hardware control logic, a hardware finite state machine (FSM), a digital signal processor (DSP), or a combination thereof. The first control interface 216 can be used for communication between the first control unit 206 and other functional units in the first device 106. The first control interface 216 can also be used for communication that is external to the first device 106.

The first control interface 216 can receive information from the other functional units or from external sources, or can transmit information to the other functional units or to external destinations. The external sources and the external destinations refer to sources and destinations external to the first device 106.

The first control interface 216 can be implemented in different ways and can include different implementations depending on which functional units or external units are being interfaced with the first control interface 216. For example, the first control interface 216 can be implemented with a pressure sensor, an inertial sensor, a microelectromechanical system (MEMS), optical circuitry, waveguides, wireless circuitry, wireline circuitry, or a combination thereof.

The location unit 214 can generate location information, current heading, and current speed of the first device 106, as examples. The location unit 214 can be implemented in many ways. For example, the location unit 214 can function as at least a part of a global positioning system (GPS), an inertial navigation system, a cellular-tower location system, a pressure location system, or any combination thereof.

The location unit 214 can include a location interface 220. The location interface 220 can be used for communication between the location unit 214 and other functional units in the first device 106. The location interface 220 can also be used for communication that is external to the first device 106.

The location interface 220 can receive information from the other functional units or from external sources, or can transmit information to the other functional units or to external destinations. The external sources and the external destinations refer to sources and destinations external to the first device 106.

The location interface 220 can include different implementations depending on which functional units or external units are being interfaced with the location unit 214. The location interface 220 can be implemented with technologies and techniques similar to the implementation of the first control interface 216.

The first storage unit 208 can store the first software 218. The first storage unit 208 can also store the relevant information, such as advertisements, points of interest (POI), navigation routing entries, or any combination thereof.

The first storage unit 208 can be a volatile memory, a nonvolatile memory, an internal memory, an external memory, or a combination thereof. For example, the first storage unit 208 can be a nonvolatile storage such as non-volatile random access memory (NVRAM), Flash memory, disk storage, or a volatile storage such as static random access memory (SRAM).

The first storage unit 208 can include a first storage interface 222. The first storage interface 222 can be used for communication between the first storage unit 208 and other functional units in the first device 106. The first storage interface 222 can be used for communication that is external to the first device 106.

The first storage interface 222 can receive information from the other functional units or from external sources, or can transmit information to the other functional units or to external destinations. The external sources and the external destinations refer to sources and destinations physically separate from the first device 106.

The first storage interface 222 can include different implementations depending on which functional units or external units are being interfaced with the first storage unit 208. The first storage interface 222 can be implemented with technologies and techniques similar to the implementation of the first control interface 216.

The first communication unit 210 can enable external communication to and from the first device 106. For example, the first communication unit 210 can permit the first device 106 to communicate with the second device 108 of FIG. 1, such as a peripheral device or a computer desktop, and the communication path 110.

The first communication unit 210 can also function as a communication hub allowing the first device 106 to function as part of the communication path 110 and not limited to be an end point or terminal unit to the communication path 110. The first communication unit 210 can include active and passive components, such as microelectronics or an antenna, for interaction with the communication path 110.

The first communication unit 210 can include a first communication interface 224. The first communication interface 224 can be used for communication between the first communication unit 210 and other functional units in the first device 106. The first communication interface 224 can receive information from the other functional units or can transmit information to the other functional units.

The first communication interface 224 can include different implementations depending on which functional units are being interfaced with the first communication unit 210. The first communication interface 224 can be implemented with technologies and techniques similar to the implementation of the first control interface 216.

The first user interface 212 allows a user (not shown) to interface and interact with the first device 106. The first user interface 212 can include an input device and an output device. Examples of the input device of the first user interface 212 can include a keypad, a touchpad, soft-keys, a keyboard, a microphone, or any combination thereof to provide data and communication inputs.

The first user interface 212 can include a first display interface 226. The first display interface 226 can include a display, a projector, a video screen, a speaker, or any combination thereof.

The first control unit 206 can operate the first user interface 212 to display information generated by the navigation system 100. The first control unit 206 can also execute the first software 218 for the other functions of the navigation system 100, including receiving location information from the location unit 214. The first control unit 206 can further execute the first software 218 for interaction with the communication path 110 via the first communication unit 210.

The second device 108 can be optimized for implementing the present invention in a multiple device embodiment with the first device 106. The second device 108 can provide the additional or higher performance processing power compared to the first device 106. The second device 108 can include a second control unit 228, a second communication unit 230, and a second user interface 232.

The second user interface 232 allows a user (not shown) to interface and interact with the second device 108. The second user interface 232 can include an input device and an output device. Examples of the input device of the second user interface 232 can include a keypad, a touchpad, softkeys, a keyboard, a microphone, or any combination thereof to provide data and communication inputs. Examples of the output device of the second user interface 232 can include a second display interface 234. The second display interface 234 can include a display, a projector, a video screen, a speaker, or any combination thereof.

The second control unit 228 can execute a second software 236 to provide the intelligence of the second device 108 of the navigation system 100. The second software 236 can operate in conjunction with the first software 218. The second control unit 228 can provide additional performance compared to the first control unit 206.

The second control unit 228 can operate the second user interface 232 to display information. The second control unit 228 can also execute the second software 236 for the other functions of the navigation system 100, including operating the second communication unit 230 to communicate with the first device 106 over the communication path 110.

The second control unit 228 can be implemented in a number of different manners. For example, the second control unit 228 can be a processor, an embedded processor, a microprocessor, a hardware control logic, a hardware finite state machine (FSM), a digital signal processor (DSP), or a combination thereof.

The second control unit 228 can include a second control interface 238. The second control interface 238 can be used for communication between the second control unit 228 and other functional units in the second device 108. The second control interface 238 can also be used for communication that is external to the second device 108.

The second control interface 238 can receive information from the other functional units or from external sources, or can transmit information to the other functional units or to external destinations. The external sources and the external destinations refer to sources and destinations external to the second device 108.

The second control interface 238 can be implemented in different ways and can include different implementations depending on which functional units or external units are being interfaced with the second control interface 238. For example, the second control interface 238 can be implemented with a pressure sensor, an inertial sensor, a microelectromechanical system (MEMS), optical circuitry, waveguides, wireless circuitry, wireline circuitry, or a combination thereof.

A second storage unit 240 can store the second software 236. The second storage unit 240 can also store the relevant information, such as advertisements, points of interest (POI), navigation routing entries, or any combination thereof. The second storage unit 240 can be sized to provide the additional storage capacity to supplement the first storage unit 208.

For illustrative purposes, the second storage unit 240 is shown as a single element, although it is understood that the second storage unit 240 can be a distribution of storage elements. Also for illustrative purposes, the navigation system 100 is shown with the second storage unit 240 as a single hierarchy storage system, although it is understood that the navigation system 100 can have the second storage unit 240 in a different configuration. For example, the second storage unit 240 can be formed with different storage technologies forming a memory hierarchal system including different levels of caching, main memory, rotating media, or off-line storage.

The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM).

The second storage unit 240 can include a second storage interface 242. The second storage interface 242 can be used for communication between the second storage unit 240 and other functional units in the second device 108. The second storage interface 242 can be used for communication that is external to the second device 108.

The second storage interface 242 can receive information from the other functional units or from external sources, or can transmit information to the other functional units or to external destinations. The external sources and the external destinations refer to sources and destinations physically separate from the second device 108.

The second storage interface 242 can include different implementations depending on which functional units or external units are being interfaced with the second storage unit 240. The second storage interface 242 can be implemented with technologies and techniques similar to the implementation of the second control interface 238.

The second communication unit 230 can enable external communication to and from the second device 108. For example, the second communication unit 230 can permit the second device 108 to communicate with the first device 106 over the communication path 110.

The second communication unit 230 can also function as a communication hub allowing the second device 108 to function as part of the communication path 110 and not limited to be an end point or terminal unit to the communication path 110. The second communication unit 230 can include active and passive components, such as microelectronics or an antenna, for interaction with the communication path 110.

The second communication unit 230 can include a second communication interface 244. The second communication interface 244 can be used for communication between the second communication unit 230 and other functional units in the second device 108. The second communication interface 244 can receive information from the other functional units or can transmit information to the other functional units.

The second communication interface 244 can include different implementations depending on which functional units are being interfaced with the second communication unit 230. The second communication interface 244 can be implemented with technologies and techniques similar to the implementation of the second control interface 238.

The first communication unit 210 can couple with the communication path 110 to send information to the second device 108 in the first device transmission 202. The second device 108 can receive information in the second communication unit 230 from the first device transmission 202 of the communication path 110.

The second communication unit 230 can couple with the communication path 110 to send information to the first device 106 in the second device transmission 204. The first device 106 can receive information in the first communication unit 210 from the second device transmission 204 of the communication path 110. The navigation system 100 can be executed by the first control unit 206, the second control unit 228, or a combination thereof.

For illustrative purposes, the second device 108 is shown with the partition having the second user interface 232, the second storage unit 240, the second control unit 228, and the second communication unit 230, although it is understood that the second device 108 can have a different partition. For example, the second software 236 can be partitioned differently such that some or all of its function can be in the second control unit 228 and the second communication unit 230. Also, the second device 108 can include other functional units not shown in FIG. 2 for clarity.

The functional units in the first device 106 can work individually and independently of the other functional units. The first device 106 can work individually and independently from the second device 108 and the communication path 110.

The functional units in the second device 108 can work individually and independently of the other functional units. The second device 108 can work individually and independently from the first device 106 and the communication path 110.

For illustrative purposes, the navigation system 100 is described by operation of the first device 106 and the second device 108. It is understood that the first device 106 and the second device 108 can operate any of the modules and functions of the navigation system 100. For example, the first device 106 is described to operate the location unit 214, although it is understood that the second device 108 can also operate the location unit 214.

Figure 3:
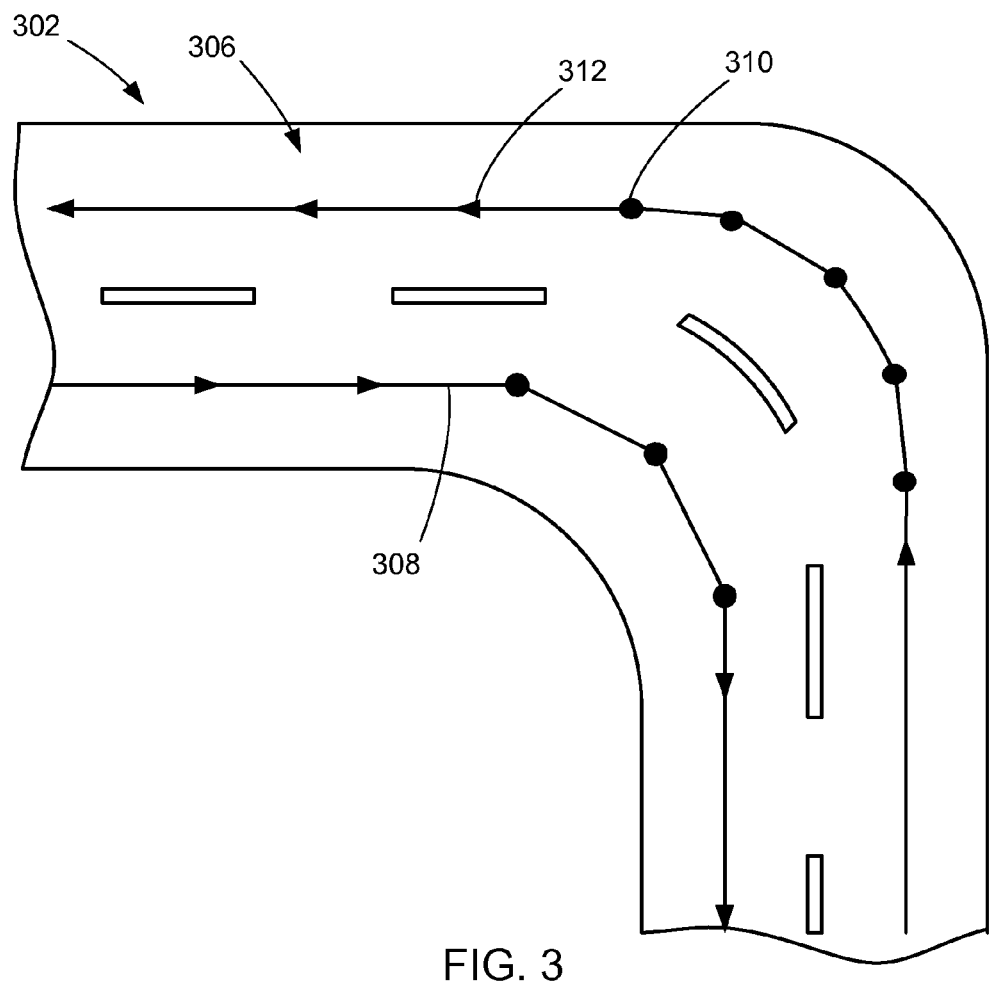
FIG. 3 is an example of a road topology map for a segment of a road for map matching the location of the first device of FIG. 1 by the navigation system of FIG. 1.

Referring now to FIG. 3, therein is shown an example of a road topology map 302 for a segment of a road 306 for map matching the location of the first device 106 of FIG. 1 by the navigation system 100 of FIG. 1. The road topology map 302 is defined as a graph of interconnected and directional edges corresponding to segments of real-world vehicle pathways. For example, these real-world vehicle pathways can include roads, highways, waterways, airways, or a combination thereof. The road topology map 302 can include a layout of interconnections of various edges and links of a vehicle pathway network.

The road topology map 302 includes edges 308. The edges 308 are defined as topological vectors, straight or curved, corresponding to a portion of the segment of the road 306. The edges 308 can include shape points 310. The shape points 310 can be used to show the connections between the edges 308. The shape points 310 are defined as spaced apart locations on each of the edges 308.

The segment of the road 306 is composed of one or more of the edges 308 depending on the shape of the road 306. Each of the edges 308 provides the shape points 310, and information regarding how the edge connects to other edges.

Each of the edges 308 has an edge heading 312, represented by the illustrated arrow. The edge heading 312 is defined as an angle from a reference direction to the direction of an edge. The reference direction is system parameter picked so that all heading angles within the navigation system 100 are represented as a deviation from that reference direction. For example, the reference direction can be defined as magnetic north, true north, or true east. For an edge that is curved, the edge heading 312 can be the direction of the edge at the end of the edge. Each of the edges 308 has at least two of the shape points 310. When one of the edges 308 has more than two of the shape points 310, then there is more than one possible value for the edge heading 312, one for each pair of consecutive shape points.

It has been discovered that the road topology map 302 having the edges 308 with the shape points 310 provides the navigation system 100 of FIG. 1 with more relevant information for a safer operation of a vehicle. With the road topology map 302 having the edges 308 with the shape points 310, the navigation system 100 can accurately predict the heading and position information of points on the edges 308. Accurate estimation of the edge heading 312 and other geometric information of the edges 308 allows for accurate positioning of a vehicle using the navigation system 100. As a result, the road topology map 302 having the edges 308 with the shape points 310 can aid the user of safer operation of the vehicle by having accurate vehicle position data.

Figure 4:
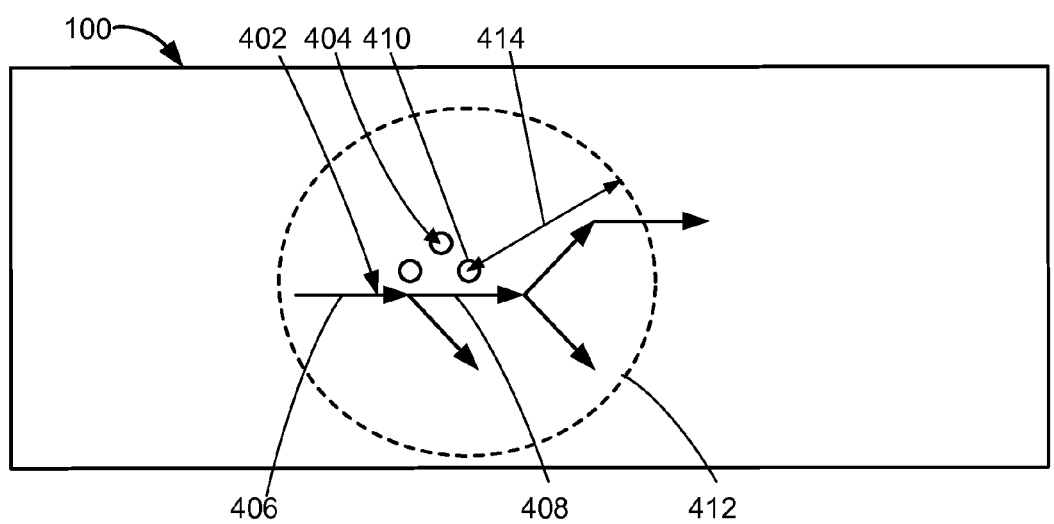
FIG. 4 is an example of a topological tree generated by the navigation system based on positions of the first device of FIG. 1.

Referring now to FIG. 4, therein is shown an example of a topological tree 402 generated by the navigation system 100 based on positions 404 of the first device 106 of FIG. 1. The positions 404 are defined as previously recorded locations of the first device 106 observed by the location unit 214 of FIG. 2. The topological tree 402 is defined as a hierarchical structure where each node in the hierarchical structure represents an edge in the road topology map 302 of FIG. 3.

The topological tree 402 can be updated dynamically as the positions 404 of the first device 106 are updated using the location unit 214. The topological tree 402 can function as a structure to support matching the positions 404 to the edges 308 of FIG. 3 in the road topology map 302. The topological tree 402 can be generated only when the first device 106 is powered on or when the first device 106 starts to move. The road topology map 302 on the other hand can be updated less frequently, and can include the edges 308 that are not proximate to the current location of the first device 106.

The topological tree 402 can include a root edge 406 with leaf edges and branch edges going outwards from the root edge 406. The root edge 406 is defined as the first edge of the topological tree 402 from which other edges originate, and also represents where the first device 106 was initially located when the topological tree 402 was created.

In this figure, the topological tree 402 is shown with the root edge 406, connected to a last matched edge 408. The last matched edge 408 is defined as an edge on the topological tree 402 most recently determined to be where the first device 106 is. The positions 404 of the first device 106 are tracked by the location unit 214 for the purpose of map matching. In this example, the last matched edge 408 corresponds to a current position 410. The current position 410 is defined as the last received instance of the positions 404. The current position 410 can be determined by the location unit 214.

During an initialization stage of the navigation system 100, the topological tree 402 can be expanded along the root edge 406 until reaching a border of a termination condition 412. The initialization stage can function to create the topological tree 402 from scratch by accessing the road topological map 302. The root edge 406 can be selected from the edges 308 on the road topological map 302 that is spatially closest to the current position 410. Other methods of selecting the root edge 406 are described later. More of the edges 308 can be added to the topological tree 402 that originate from the root edge 406.

The termination condition 412 is defined as an area bounded by a geometric shape around the current position 410 beyond which new edges cannot be added to the topological tree 402. For example, the termination condition 412 can be bounded by a circle range with a radius equal to a locator error range 414. The size, shape, or radius of the termination condition 412 can vary depending on the complexity of the road topology map 302, such as a density of edges in the road topology map 302 near the current position 410. New edges can be added to the topological tree 402 and old edges can be removed from the topological tree 402 as shown in FIG. 5.

The locator error range 414 is defined as a distance from a reported position of the location unit 214 beyond which is pre-determined to be unlikely where the actual position of the location unit 214 lies given the technical specification of the location unit 214. For example, the locator error range 414 can be 100 meters or 80 meters.

To initiate map matching, the navigation system 100 can first initialize the topological tree 402. As a specific example, the following are the steps to initialize the topological tree 402. The root edge 406 is determined by using the positions 404 and the road topology map 302 to find one edge representing where the first device 106 is located. Every edge within a pre-determined distance from the current position 410 is scored in a scoring stage of the navigation system 100 as described below. The edge with the lowest score is determined to be the root edge 406. This edge can have a heading that is the average of the headings of vectors between the positions 404. The edge with the lowest score can also be the edge spatially closest to the current position 410 during the initialization stage. Any of the edges 308 within the termination condition 412, which is connected to the root edge 406, is added to the topological tree 402.

Figure 5:
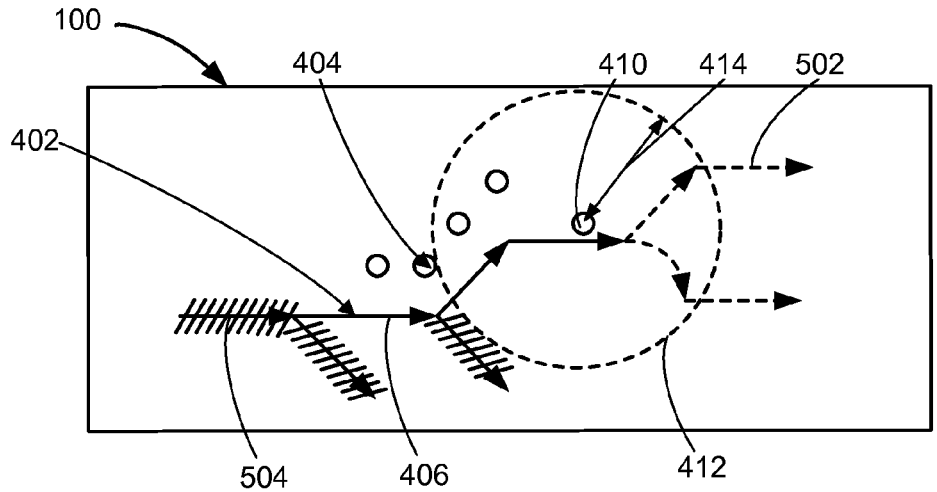
FIG. 5 is an example of the topological tree during an updating stage of operation of the navigation system.

Referring now to FIG. 5, therein is shown an example of the topological tree 402 during an updating stage of operation of the navigation system 100. During the updating stage of operation, new edges 502 are recursively added to the proper parent edges in the topological tree 402, and old edges 504 are removed, both adding and removing based on connectivity. The topological tree 402 can be updated in different frequencies. For example, the topological tree 402 can be updated according to the speed of travel of the first device 106 of FIG. 1.

When the first device 106 move forward, such as when the first device 106 is in a moving vehicle, the new edges 502 are added to the topological tree 402. Any of the edges 308 of FIG. 3 connected to the root edge 406 within the termination condition 412, can be added to the topological tree 402. The new edges 502 can be added based on a density of the edges 308 in the road topology map 302 of FIG. 3 near the current position 410, such as the density of the edges 308 in the road topology map 302 within the locator error range 414 of the current position 410. For example, the termination condition 412 can be expanded when the density of the edges 308 in the road topology map 302 near the current position 410 is higher. The termination condition 412 can be shrunk when the density of the edges 308 in the road topology map 302 near the current position 410 is higher.

The navigation system 100 can remove the old edges 504 when the old edges 504 are identified as invalid. For example, when the old edges 504 are outside of the termination condition 412, and none of its descendant edges are within the termination condition 412, the old edges 504 are removed. When the root edge 406 is one of the old edges 504 removed, it can be updated and reset by another edge, such as a child edge of the root edge 406 within the termination condition 412 or a sibling edge of the edge removed.

It has been discovered updating the topological tree 402 in real-time dynamically makes the navigation system 100 more robust even when the location unit 214 of FIG. 2 is unreliable, failing, or in error. Unreliability can stem from weak signal, interference, or signal blocking structures. When the location unit 214 is unreliable, failing or in error, the positions 404 received have to be adjusted in order to be accurate. Updating the topological tree 402 in real-time allows for even more accurate map matching based on selecting additional relevant information from the topological tree 402, such as the locations and headings of the edges 308 or the connectivity and reachability of the edges 308. Accurate map matching is an essentially criterion of a robust navigation system, and thus updating the topological tree 402 dynamically makes the navigation system 100 more robust.

Figure 6A:
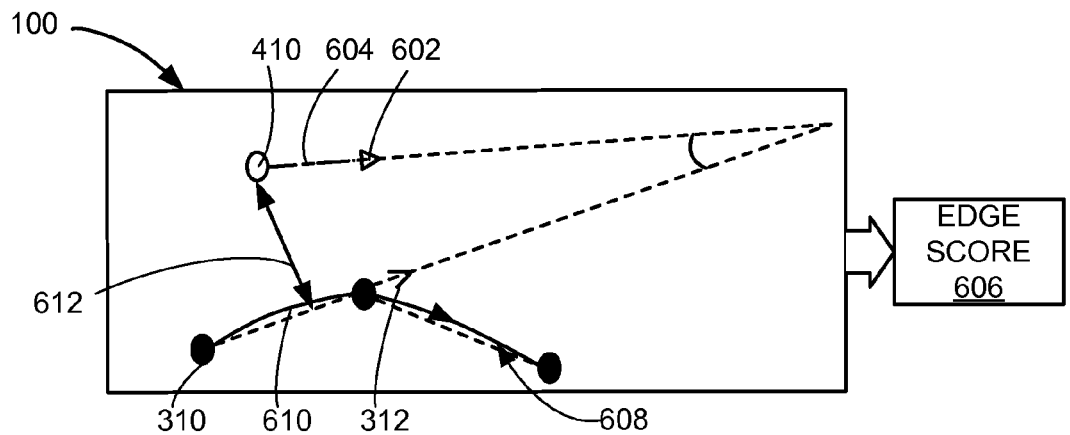
FIG. 6A is an example of an edge scoring stage of operation of the navigation system.
Figure 6B:
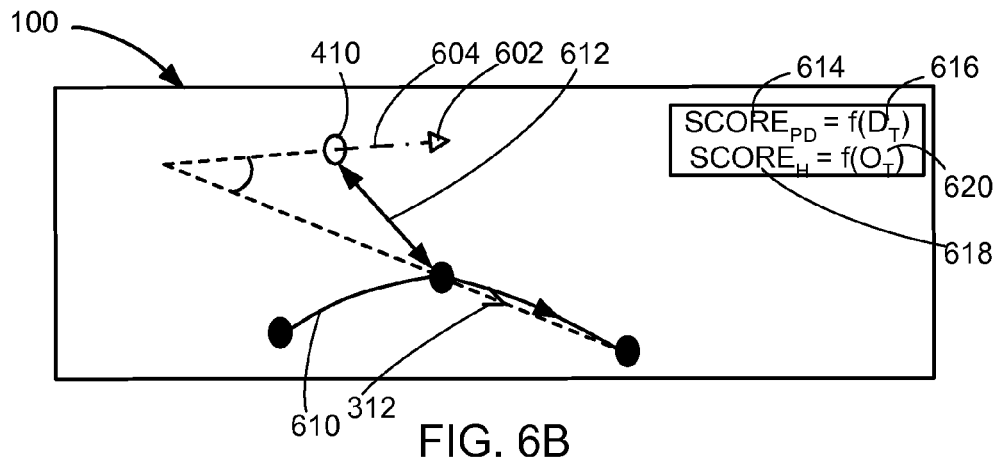
FIG. 6B is another example of the edge scoring stage of operation of the navigation system.

Referring now to FIGS. 6A and 6B, therein are shown examples of an edge scoring stage of operation of the navigation system 100. The purpose of the edge scoring stage of operation of the navigation system 100 is to select an edge having the highest probability to be where the first device 106 of FIG. 1 is located compared to other edges in the topological tree 402 of FIG. 4. The scoring stage can be used to determine the actual position and status of the location unit 214 of FIG. 2. For example, if the first device 106 is used to track a vehicle, the scoring stage can be used to determine if the vehicle is on track, on road, off road, and etc. "On track", "on road", "off road", or "off track" can be examples of the status of the first device 106 generated by the navigation system 100.

A device heading 602, the current position 410, and a device speed 604 can be used to calculate an edge score 606 of a target edge 608 in the topological tree 402. The edge score 606 of the target edge 608 is defined as a numeric value based on the probability that the actual location of the first device 106 is on the target edge 608. The target edge 608 is defined as one candidate in the edges 308 of FIG. 3 of the topological tree 402 that can potentially be where the first device 106 is located at currently.

The device heading 602 is defined as the direction of where the first device 106 is moving in reference to the reference direction. The device heading 602 can be calculated by the angle of a vector between any two of the positions 404 of FIG. 4 returned by the location unit 214. The device speed 604 is defined as an estimate of the velocity that the first device 106 is traveling. The device speed 604 can be calculated by the magnitude of a vector between any two of the positions 404 returned by the location unit 214 divided by the time lapse therebetween. The device speed 604 can also be calculated by averaging a number of the magnitudes of vectors between consecutive pairs of the positions 404 divided by the time lapse therebetween the pair. The averaging can be calculated within a pre-determined number of the positions 404.

The edge score 606 can be calculated based on position and heading. When there are more than two of the shape points 310 on the target edge 608, a shape line 610 can be selected to be used for calculating a separation distance 612 and the difference between the edge heading 312 and the device heading 602. The shape line 610 is defined as the line segment between two of the shape points 310.

The separation distance 612 is defined as either: (1) the perpendicular distance from the current position 410 to the shape line 610 of the target edge 608, as shown in FIG. 6A or (2) if the intersection point is out of the target edge 608, then the shortest distance between the current position 410 and the shape line 610 as shown in FIG. 6B. The edge heading 312 is the angular portion of the vector between the ends of the shape line 610.

An instance of the shape line 610 is preferred over another by having a lower value of the separation distance 612 plus the difference between the edge heading 312 and the device heading 602. The shape line 610 having the lowest value is selected for calculating the edge score 606. Hence, the edge heading 312 and the separation distance 612 of the shape line 610 can be used as the edge heading 312 and the separation distance 612 of the target edge 608.

The edge score 606 can be calculated based on position such that a position score 614 is calculated based on the separation distance 612 and a distance threshold 616. The position score 614 is defined as a subcomponent of the edge score 606 that is based on location of the target edge 608. The distance threshold 616 is defined as a pre-determined threshold value in a unit of distance.

The edge score 606 can also be based on heading such that a heading score 618 is calculated based on the difference between the device heading 602, the edge heading 312, and an angle threshold 620. The heading score 618 is defined as a subcomponent of the edge score 606 that is based on the edge heading 312 of the target edge 608. The angle threshold 620 is defined as a pre-determined threshold value in a unit of angle. Both the angle threshold 620 and the distance threshold 616 can be inputted into the first device 106 or the second device 108 of FIG. 1 via the first user interface 212 of FIG. 2 or the second user interface 232 of FIG. 2.

As a specific example, the following can be an example of a scoring scheme of the navigation system 100. For the separation distance 612 less than the distance threshold 616, the position score 614 can be 0. Else if not, for the separation distance 612 less than five times the distance threshold 616, the position score 614 can be increased by 1. Else if not, for the separation distance 612 less than eight times the distance threshold 616, the position score 614 can be increased by 2. Else if not, for the separation distance 612 less than sixteen times the distance threshold 616, the position score 614 can be increased by 3. In this example, the higher the position score 614 is, the lower the probability that the target edge 608 falls on the actual location of the first device 106.

As another specific example, the following can be an example of a scoring scheme for the navigation system 100. For the difference between the device heading 602 and the edge heading 312 less than the angle threshold 620, the heading score 618 can be 0. Else if not, for the difference between the device heading 602 and the edge heading 312 less than two times the angle threshold 620, the heading score 618 can be increased by 1. Else if not, for the difference between the device heading 602 and the edge heading 312 less than three times the angle threshold 620, the heading score 618 can be increased by 3. Else if not, for the difference between the device heading 602 and the edge heading 312 less than four times the angle threshold 620, the heading score 618 can be increased by 5. In this example, the higher the heading score 618 is, the lower the probability that the target edge 608 falls on the actual location of the first device 106.

The above two specific examples can be exemplified by the following pseudo code, where $SCORE_{pd}$ represents the position score 614 and $SCORE_h$ represents the heading score 618:

```
If D₁ < positionThreshold, SCORE_pd = 0;
If D₁ >= positionThreshold and D₁ < positionThreshold*5,
    SCORE_pd = SCORE_pd +1;
If D₁ >= positionThreshold*5 and D₁ < positionThreshold*8,
    SCORE_pd = SCORE_pd +2;
If D₁ >= positionThreshold*8 and D₁ < positionThreshold*16,
    SCORE_pd = SCORE_pd +3;
If D₁ >= positionThreshold*16, SCORE_pd = SCORE_pd +4;
If α₁ < headingThreshold, SCORE_h = 0;
If α₁ >= headingThreshold and α₁ < headingThreshold*2,
    SCORE_h = SCORE_h +1;
If α₁ >= headingThreshold*2 and α₁ < headingThreshold*3,
    SCORE_h = SCORE_h +3;
If α₁ >= headingThreshold*3 and α₁ < headingThreshold*4,
    SCORE_h = SCORE_h +5;
If α₁ >= headingThreshold*4, SCORE_h = SCORE_h +7;
```

Figure 7:
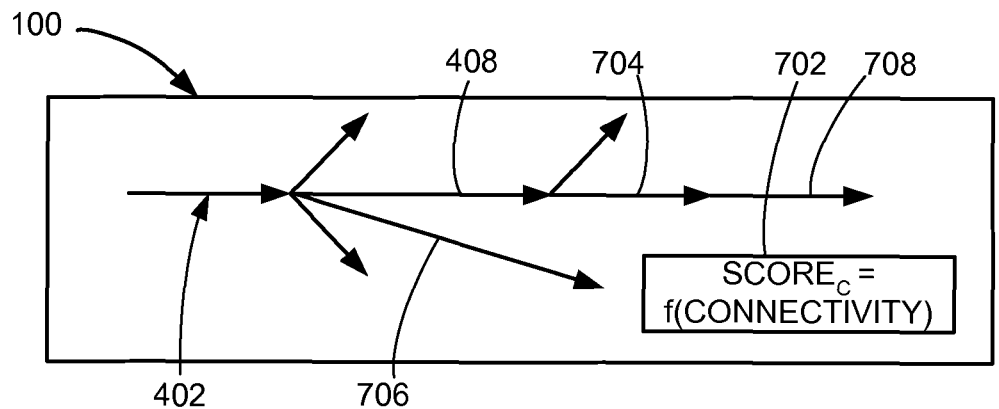
FIG. 7 is an example of the topological tree in a connectivity scoring stage of operation of the navigation system.

Referring now to FIG. 7, therein is shown an example of the topological tree 402 in a connectivity scoring stage of operation of the navigation system 100. The edge score 606 of FIG. 6A based on connectivity can increase depending on the number of interposing edges between the target edge 608 of FIG. 6A and the last matched edge 408. A connectivity score 702 is defined as a subcomponent of the edge score 606 that is based on connectivity of the target edge 608.

For example, the connectivity score 702 based on connectivity can be highest to lowest in the following order: (1) when the target edge 608 is the last matched edge 408; (2) when the target edge 608 is a child edge 704 of the last matched edge 408; (3) when the target edge 608 is a sibling edge 706 of the last matched edge 408; and (4) when the target edge 608 is a grandchild edge 708 of the last matched edge 408. The child edge 704 is defined as an edge immediately following and connected to the last matched edge 408. The sibling edge 706 is defined as an edge stemming from the same edge as the last matched edge 408. The grandchild edge 708 is defined as an edge immediately following and connected to an edge immediately following and connected to the last matched edge 408. The connectivity score 702 when the target edge 608 is the last matched edge 408 can be the same as when the target edge 608 is the child edge 704 of the last matched edge 408.

As a specific example, the following can be an example of a scoring scheme of the navigation system 100. For when the target edge 608 is the last matched edge 408, the connectivity score 702 can be 10. For when the target edge 608 is the child edge 704 of the last matched edge 408, the connectivity score 702 can also be 10. For when the target edge 608 is the sibling edge 706 of the last matched edge 408, the connectivity score 702 can be 8. For when the target edge 608 is the grandchild edge 708 of the last matched edge 408, the connectivity score 702 can be 5. The connectivity score 702 of the child edge 704 and the last matched edge 408 can be higher than the connectivity score 702 of the sibling edge 706. The connectivity score 702 of the sibling edge 706 can be higher than the connectivity score 702 of the grandchild edge 708. In this example, the higher the connectivity score 702 is, the higher the probability that the target edge 608 falls on the actual location of the first device 106 of FIG. 1.

Figure 8:
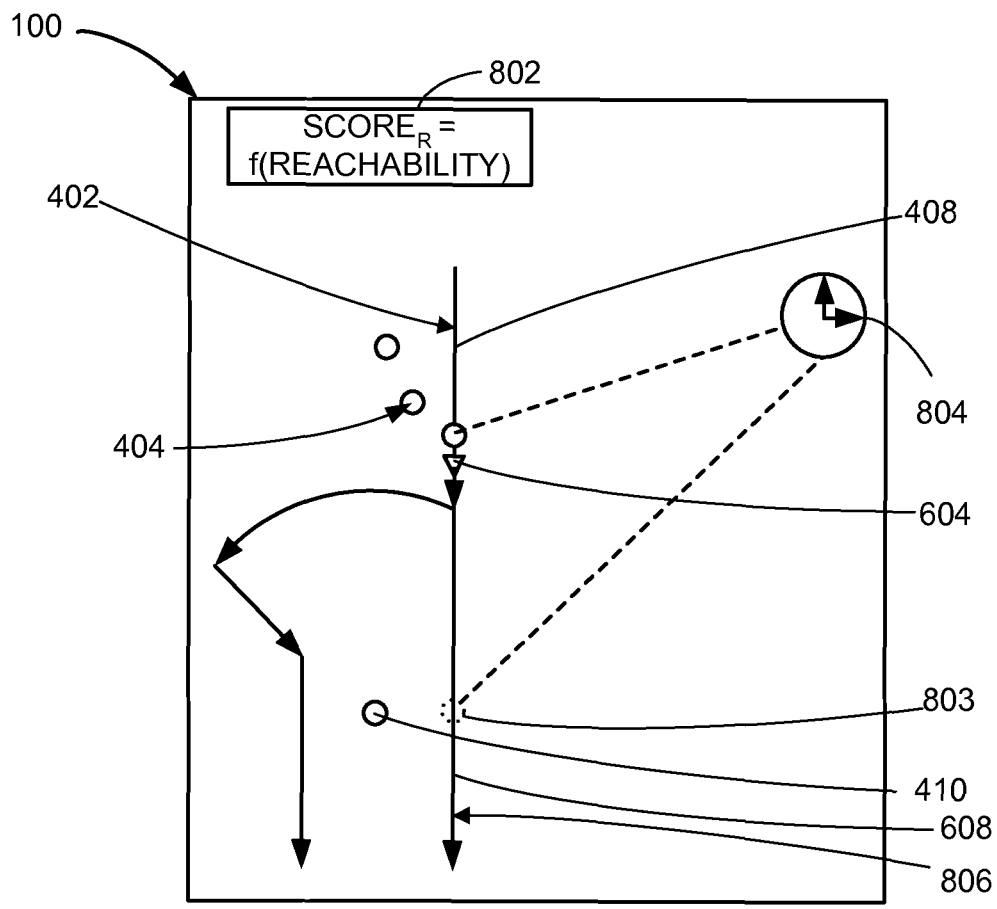
FIG. 8 is an example of the topological tree in a reachability scoring stage of operation of the navigation system.

Referring now to FIG. 8, therein is shown an example of the topological tree 402 in a reachability scoring stage of operation of the navigation system 100. The edge score 606 of FIG. 6A based on reachability can increase depending on whether the target edge 608 can be reached in time from the last matched edge 408 given the device speed 604. A reachability score 802 is defined as a subcomponent of the edge score 606 that is based on reachability of the target edge 608. Reachability is a determination of whether a device can reach a current probable location 803 on the target edge 608 given the device speed 604 in the time that has lapsed since the last location measurement from the last position detected by the device. The current probable location 803 is defined as the closest point on the target edge 608 to the current position 410.

For example, the reachability score 802 based on reachability can increase by a constant if the device speed 604 multiplied by a time difference 804 plus an error threshold range is less than the distance required to travel between the last matched edge 408 and the target edge 608 along a shortest path on the topological tree 402. The error threshold range can be equal to the locator error range 414 of FIG. 4, less than the locator error range 414, or greater than the locator error range 414. The time difference 804 is defined as how much time has passed since the last matched edge 408 was matched by the navigation system 100 until when the target edge 608 is being considered as a potential matching edge for the current position 410. The device speed 604 can be either the speed at the current position 410 or an average speed of some of the positions 404, such as the average speed at the last three positions.

The target edge 608 is reachable if the device speed 604 multiplied by the time difference 804 plus an error threshold range is less than the distance required to travel between the last matched edge 408 and the target edge 608 along edges on the topological tree 402. As a specific example, the reachability score 802 can be set to 1000 if the target edge 608 is unreachable. The reachability score 802 can be set to 0 if the target edge 608 is reachable. In this example, the higher the reachability score 802 is, the lower the probability that the target edge 608 falls on the actual location of the first device 106 of FIG. 1.

The edge score 606 of the target edge 608 can be based on the position score 614 of FIG. 6B, the heading score 618 of FIG. 6B, the connectivity score 702 of FIG. 7, the reachability score 802, separation distance 612 of FIG. 6A, edge heading 312 of FIG. 3, device heading 602 of FIG. 6A, or any combination thereof. As a specific example, the edge score 606 can be described by Equation 1 below:

[edge score 606]=100×[position score 614]+100×
  [heading score 618]−[connectivity score 702]+
  [reachability score 802]+0.5×[separation dis-
  tance 612]+0.2×([edge heading 312]−[device
  heading 602])    Eq. 1

When the target edge 608 has the lowest score amongst all of the edges 308 of FIG. 3 in the topological tree 402, the target edge 608 is determined by the navigation system 100 as a matched edge 806. The matched edge 806 is defined as the edge determined by the navigation system 100 to contain the actual location of the first device 106.

Figure 9:
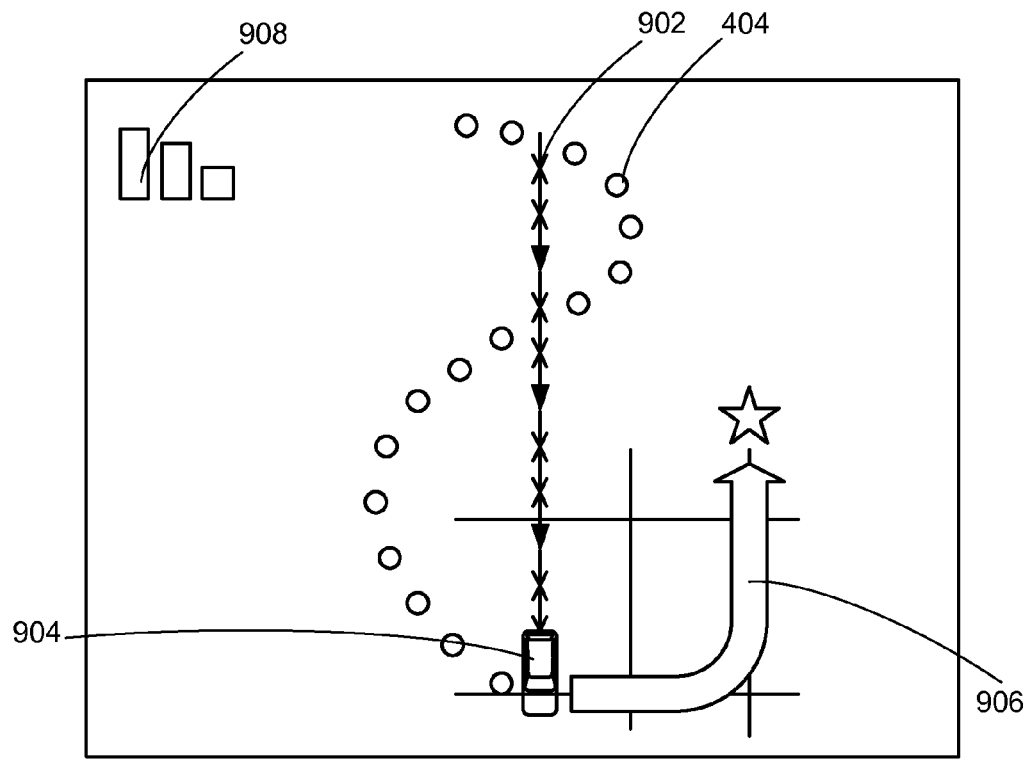
FIG. 9 is an example of a display for the navigation system of FIG. 1.

Referring now to FIG. 9, therein is shown an example of a display for the navigation system 100 of FIG. 1. Adjusted locations 902 and the positions 404 can be shown on the display for the navigation system 100. The display can be shown on the first display interface 226 of FIG. 2 of the first device 106 of FIG. 1 or the second display interface 234 of FIG. 2 of the second device 108 of FIG. 1.

The adjusted locations 902 are defined as estimated positions of the first device 106 after the positions 404 are map matched by an operation of the navigation system 100. Each of the adjusted locations 902 can be a location of one of the shape points 310 of FIG. 3 on the target edge 608 of FIG. 6A determined to be the actual location of the first device 106. Each of the adjusted locations 902 can be the closest one of the shape points 310 on the target edge 608. Each of the adjusted locations 902 can be the closest point on the target edge 608 from each of the positions 404.

FIG. 9 also shows a location indicator 904 on top of the last of the adjusted locations 902. The location indicator 904 is defined as an icon displayable on either the first device 106 or the second device 108 for illustrating the map matched location of the first device 106.

It has been discovered that scoring the target edge 608 of the topological tree 402 of FIG. 4 to determine the adjusted locations 902 can correct the inaccuracies associated with the positions 404 received from the location unit 214 of FIG. 2. At times when the location unit 214 has a weak signal or there are a lot of structures interfering with a location signal used by the location unit 214, the positions 404 received from the location unit 214 would be inaccurate. The topological tree 402 limits down the potential candidates for the adjusted locations 902 while the scoring of the target edge 608 from the topological tree 402 can select the most likely candidate. Accordingly, scoring the target edge 608 of the topological tree 402 to determine the adjusted locations 902 can correct the inaccuracies associated with the positions 404 received from the location unit 214.

The navigation system 100 can calculate and display a travel route 906 based on the adjusted locations 902. The travel route 906 is defined as a path calculated by the navigation system 100 for navigating to a destination. For example, the navigation system 100 can calculate and display the travel route 906 based on the adjusted locations 902 when a locator signal strength 908 is low. The locator signal strength 908 is defined as a signal power measurement of a locating or positioning signal received by the location unit 214.

Figure 10:
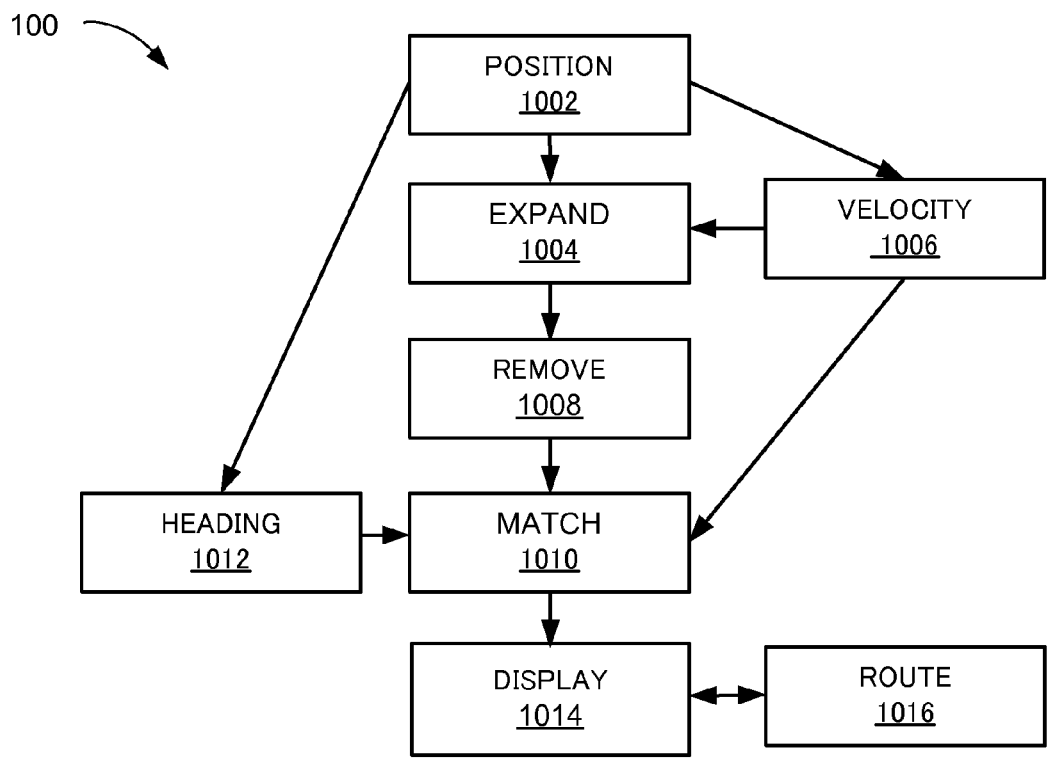
FIG. 10 is a control flow of the navigation system.

Referring now to FIG. 10, therein is shown a control flow of the navigation system 100. The navigation system 100 can include a position module 1002. The position module 1002 is for determining the location information of a device in the navigation system 100. The position module 1002 can function to receive the current position 410 of FIG. 4 from the location unit 214 of FIG. 2 via the location interface 220 of FIG. 2.

The navigation system 100 can include an expand module 1004. The expand module 1004 is a module of the navigation system 100 for constructing a topological tree. The expand module 1004 can be coupled to the position module 1002.

The expand module 1004 can function to add the new edges 502 of FIG. 5 to the topological tree 402 of FIG. 4 based on the current position 410 from the road topology map 302 of FIG. 3, with the current position 410 received from the position module 1002. The new edges 502 added can have the shape points 310 of FIG. 3. The expand module 1004 can also function to add the new edges 502 based on a density of the edges 308 of FIG. 3 in the road topology map 302 near the current position 410, such as a density of the edges 308 within the locator error range 414 of FIG. 4 of the current position 410.

The navigation system 100 can include a velocity module 1006. The velocity module 1006 is for determining a velocity vector of the first device 106 of FIG. 1 from the positioning data of the first device 106 received from the location unit 214. The velocity module 1006 can be coupled to the position module 1002. The velocity module 1006 can function to determine the device speed 604 of FIG. 6A at the current position 410, with the current position 410 received from the position module 1002.

The expand module 1004 can be further coupled to the velocity module 1006. The expand module 1004 can function to add the new edges 502 more frequently when the device speed 604 changes, with the device speed 604 determined by the velocity module 1006.

The navigation system 100 can include a remove module 1008. The remove module 1008 is for reducing the size of a topological tree. The remove module 1008 can be coupled to the position module 1002.

The remove module 1008 can function to remove the old edges 504 of FIG. 5 from the topological tree 402 of FIG. 4 based on the current position 410, with the current position 410 received from the position module 1002. The remove module 1008 can also function to remove the old edges 504 based on the locator error range 414.

The navigation system 100 can include a match module 1010. The match module 1010 is for matching a target edge as the edge that the first device 106 of FIG. 1 is currently on, from the edges in the road topology map 302. The match module 1010 can be coupled to the expand module 1004 and the remove module 1008.

The match module 1010 can function to determine the matched edge 806 of FIG. 8 of the topological tree 402 based on the current position 410 and the topological tree 402, with the topological tree 402 generated from adding and removing of edges by the operation of the expand module 1004 and the remove module 1008. The match module 1010 can determine the matched edge 806 by determining whether the matched edge 806 is a child edge, a sibling edge, or a grandchild edge of the last matched edge 408 of FIG. 4. The match module 1010 can determine the matched edge 806 by calculating the edge score 606 of FIG. 6A for the matched edge 806 based on the distance between the current position 410 and the matched edge 806, and comparing the edge score 606 with scores of other edges in the topological tree 402.

The match module 1010 can further be coupled to the velocity module 1006. The match module 1010 can determine the matched edge 806 by determining whether the matched edge 806 is reachable within the time difference 804 of FIG. 8 from the last matched edge 408 given the device speed 604, with the device speed 604 received from the velocity module 1006.

The navigation system 100 can include a heading module 1012. The heading module 1012 is for calculating the heading of the first device 106. The heading module 1012 can be coupled to the position module 1002. The heading module 1012 can function to determine the device heading 602 of FIG. 6A corresponding to the current position 410, with the current position 410 received from the position module 1002. The device heading 602 can be determined from any two consecutive points of the positions 404 of FIG. 4 received from the location unit 214.

The match module 1010 can further be coupled to the heading module 1012. The match module 1010 can determine the matched edge 806 by calculating the edge score 606 based on the difference between the edge heading 312 of FIG. 3 of the matched edge 806 and the device heading 602, and comparing the edge score 606 with scores of other edges in the topological tree 402, with the device heading 602 received from the heading module 1012.

The navigation system 100 can include a display module 1014. The display module 1014 is for displaying navigation related information to the user of the navigation system 100. The display module 1014 can be coupled to the match module 1010. The display module 1014 can function to calculate the adjusted locations 902 of FIG. 9 based on the matched edge 806 for displaying on the first device 106, with the matched edge 806 received from the match module 1010.

The navigation system 100 can include a route module 1016. The route module 1016 is a module of the navigation system 100 for generating a route from a current estimated position to a user-defined final destination. The route module 1016 can be coupled to the display module 1014. The route module 1016 can function to generate the travel route 906 of FIG. 9 based on the adjusted locations 902 when the locator signal strength 908 of FIG. 9 is low, with the adjusted locations 902 received from the display module 1014. The route module 1016 can be for determining whether the adjusted locations 902 have deviated from the travel route 906.

The display module 1014 can function to display the travel route 906 on the first device 106, with the travel route 906 generated from the route module 1016. The display module 1014 can confirm that the adjusted locations 902 have deviated from the travel route 906 by displaying the adjusted locations 902 or modifying the location indicator 904 of FIG. 9.

The first software 218 of FIG. 2 of the first device 106 of FIG. 1 can include the navigation system 100. For example, the first software 218 can include the position module 1002, the expand module 1004, the remove module 1008, the match module 1010, and the display module 1014.

The first control unit 206 of FIG. 2 can execute the first software 218 for the position module 1002 to receive the current position 410. The first control unit 206 can execute the first software 218 for the expand module 1004 to add the new edges 502 to the topological tree 402 based on the current position 410 from the road topology map 302. The first control unit 206 can execute the first software 218 for the remove module 1008 to remove the old edges 504 from the topological tree 402 based on the current position 410.

The first control unit 206 can execute the first software 218 for the match module 1010 to determine the matched edge 806 of the topological tree 402 based on the current position 410 and the topological tree 402. The first control unit 206 can execute the first software 218 for the display module 1014 to display the adjusted locations 902 based on the newly matched edge on the first device 106.

The first control unit 206 can execute the first display interface 226 of FIG. 2 to display the adjusted locations 902, the location indicator 904, or a combination thereof. The second software 236 of FIG. 2 of the second device 108 of FIG. 1 can include the navigation system 100. For example, the second software 236 can include the position module 1002, the expand module 1004, the remove module 1008, the match module 1010, and the display module 1014.

The second control unit 228 of FIG. 2 can execute the second software 236 for the position module 1002 to receive the current position 410. The second control unit 228 can execute the second software 236 for the expand module 1004 to add the new edges 502 to the topological tree 402 based on the current position 410 from the road topology map 302. The second control unit 228 can execute the second software 236 for the remove module 1008 to remove the old edges 504 from the topological tree 402 based on the current position 410. The second control unit 228 can execute the second software 236 for the match module 1010 to determine the matched edge 806 of the topological tree 402 based on the current position 410 and the topological tree 402. The second control unit 228 can execute the second software 236 for the display module 1014 to display the adjusted locations 902 based on the newly matched edge on the first device 106. The second control unit 228 can execute the second display interface 234 of FIG. 2 to display the adjusted locations 902, the location indicator 904, or a combination thereof.

The navigation system 100 can be partitioned between the first software 218 and the second software 236. For example, the second software 236 can include the expand module 1004, the remove module 1008, the match module 1010, and the display module 1014. The second control unit 228 can execute modules partitioned on the second software 236 as previously described.

The first software 218 can include the position module 1002. Based on the size of the first storage unit 208 of FIG. 2, the first software 218 can include additional modules of the navigation system 100. The first control unit 206 can execute the modules partitioned on the first software 218 as previously described.

The first user interface 212 of FIG. 2 can receive the angle threshold 620 of FIG. 6B and the distance threshold 616 of FIG. 6B from the user, the navigation system 100, or a combination thereof for the match module 1010, for example. The first control unit 206 can operate the first communication unit 210 of FIG. 2 to send the adjusted locations 902 to the second device 108. The first control unit 206 can operate the first software 218 to operate the location unit 214.

The second communication unit 230 of FIG. 2 can send the road topology map 302 to the first device 106 through the communication path 110 of FIG. 1. The adjusted locations 902, the location indicator 904, or a combination thereof can be displayed on the first display interface 226 and the second device 108.

The navigation system 100 describes the module functions or order as an example. The modules can be partitioned differently. For example, the expand module 1004 and the remove module 1008. Each of the modules can operate individually and independently of the other modules.

Furthermore, data generated in one module can be used by another module without being directly coupled to each other. For example, the remove module 1008 can receive the current position 410 from the position module 1002.

The physical transformation from displaying adjusted locations 902 based on the matched edge 806 results in movement in the physical world, such as people using the first device 106, the vehicle, or a combination thereof, based on the operation of the navigation system 100. The user of the navigation system 100 can display the adjusted locations 902 and the location indicator 904 as a user is navigating in a real-world vehicular pathway. The travel route 906 can be used in conjunction of the adjusted locations 902 to best aid users of the navigation system 100 move to their intended destinations. As the movement in the physical world occurs, the movement itself creates additional information that is converted back to the current position 410 for the continued operation of the navigation system 100 and to continue the movement in the physical world.

Figure 11:
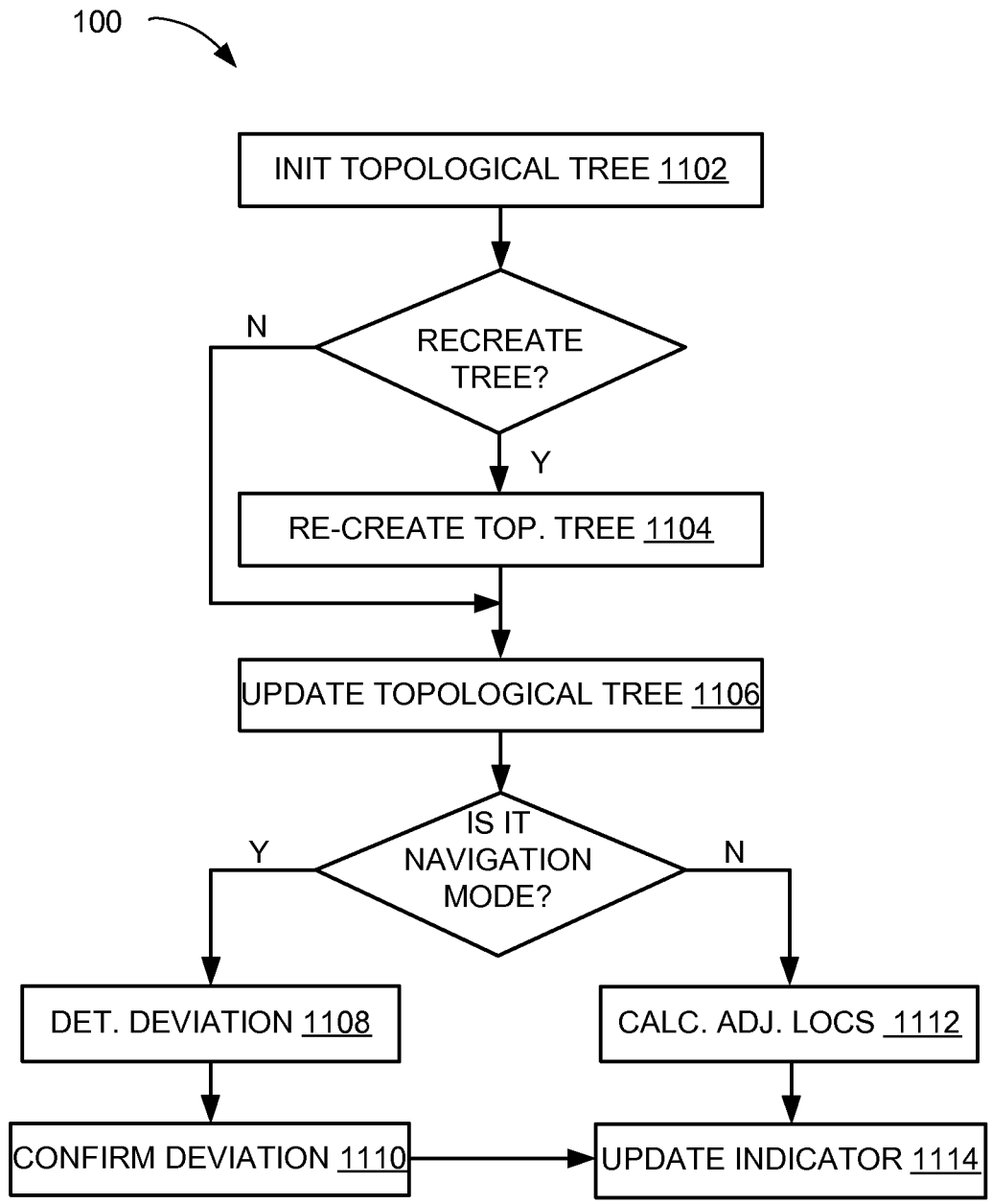
FIG. 11 is a specific example of a decision flow describing the navigation system of FIG. 1.

Referring now to FIG. 11, therein is shown a specific example of a decision flow describing the navigation system 100 of FIG. 1. The decision flow includes: initiating the topological tree 402 of FIG. 4 in a block 1102 with the expand module 1004 of FIG. 10; re-creating the topological tree 402 when the root edge 406 of FIG. 4 is not within the termination condition 412 of FIG. 4 in a block 1104 with the expand module 1004 and the remove module 1008 of FIG. 10; updating the topological tree 402 in a block 1106 with the expand module 1004 and the remove module 1008; determining a deviation from an assigned route when the navigation system 100 is in navigation mode in a block 1108 with the route module 1016 of FIG. 10; confirming the deviation in a block 1110 with the display module 1014 of FIG. 10; calculating the adjusted locations 902 of FIG. 9 when the navigation system 100 is not in navigation mode in a block 1112 with the match module 1010 of FIG. 10; and updating the location indicator 904 of FIG. 9 on a display device, such as on the first device 106 of FIG. 1 or the second device 108 of FIG. 1 in a block 1114 with the display module 1014.

Block 1104 can be used in a feedback loop in a pre-set time interval, such as every second. When the current position 410 is a threshold distance away from the topological tree 402 or when the edge score 606 for every edge in the topological tree 402 is larger than a threshold score, the block 1104 can recreate the topological tree 402. For example, GPS recovery from a long time drifting or no-GPS signal area for a long time can lead to a big jump in GPS position. At such a time, the topological tree 402 can become invalid, and the block 1104 can be responsible to create a new instance of the topological tree 402 based on the current position 410.

Figure 12:
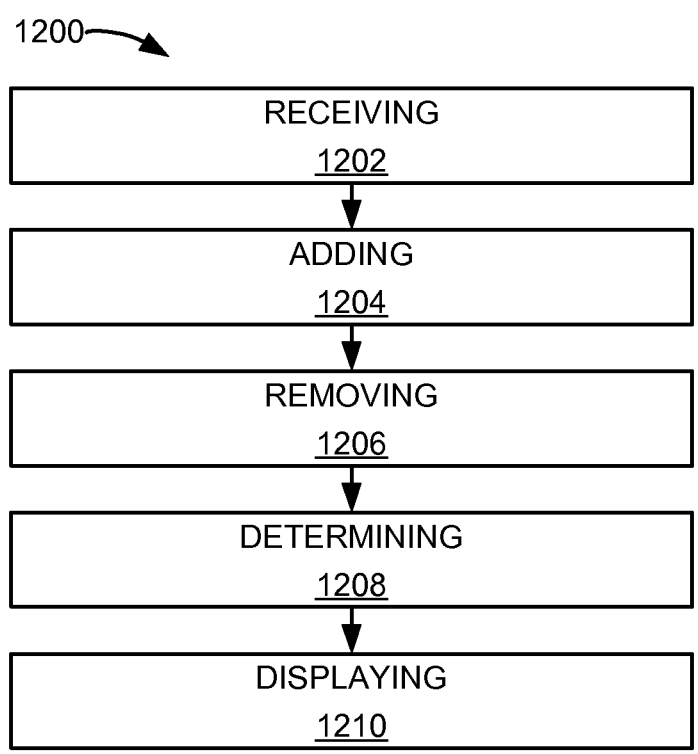
FIG. 12 is a flow chart of a method of operation of the navigation system of FIG. 1 in a further embodiment of the present invention.

Referring now to FIG. 12, therein is shown a flow chart of a method 1200 of operation of the navigation system 100 of FIG. 1 in a further embodiment of the present invention. The method 1200 includes: receiving a current position for locating a device, in a block 1202; adding a new edge from a road topology map to a topological tree based on the current position, in a block 1204; removing an old edge from the topological tree based on the current position, in a block 1206; determining a matched edge of the topological tree based on the current position and the topological tree, in a block 1208; and calculating an adjusted location based on the matched edge for displaying on the device, in a block 1210.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    receiving a current position for locating a device;
    adding a new edge from a road topology map to a topological tree based on an edge of the road topology map corresponding to the current position, wherein:
        the road topology map is for representing segments of real-world vehicle pathways,
        the topological tree is for dynamically representing a set of edges in the road topology map corresponding to the current position;
    removing an old edge outside of a termination condition with no descendant edges within the termination condition from the topological tree based on the current position;
    determining a matched edge of the topological tree based on the current position and the topological tree; and
    calculating with a control unit an adjusted location based on the matched edge for mapping the current position to the adjusted location on the matched edge.

2. The method as claimed in claim 1 wherein removing the old edge includes removing the old edge when the old edge is outside of a locator error range.

3. The method as claimed in claim 1 wherein adding the new edge includes adding the new edge based on a density of edges in the road topology map near the current position.

4. The method as claimed in claim 1 further comprising:
    determining a device speed at the current position; and
    wherein:
        adding the new edge includes adding the new edge more frequently when the device speed changes compared to when the device speed has not changed.

5. The method as claimed in claim 1 further comprising:
    generating a travel route based on the adjusted location when a locator signal strength is low; and
    wherein:
        displaying the adjusted location includes displaying the travel route on the first device.

6. A method of operation of a navigation system comprising:
    receiving a current position for locating a device;
    adding a new edge having shape points from a road topology map to a topological tree based on an edge of the road topology map corresponding to the current position, wherein:
        the road topology map is for representing segments of real-world vehicle pathways,
        the topological tree is for dynamically representing a set of edges in the road topology map corresponding to the current position;
    removing an old edge outside of a termination condition with no descendant edges within the termination condition from the topological tree based on the current position;
    determining a matched edge of the topological tree based on the current position and the topological tree; and
    calculating with a control unit an adjusted location based on the matched edge for mapping the current position to the adjusted location on the matched edge.

7. The method as claimed in claim 6 further comprising:
    determining a device speed at the current position; and
    wherein:
        determining the matched edge includes determining whether the matched edge is reachable within a time difference from a last matched edge given a device speed.

8. The method as claimed in claim 6 wherein determining the matched edge includes determining whether the matched edge is a child edge, a sibling edge, or a grandchild edge of the last matched edge.

9. The method as claimed in claim 6 wherein determining the matched edge includes calculating an edge score for the matched edge based on the distance between the current position and the matched edge.

10. The method as claimed in claim 6 further comprising:
    determining a device heading corresponding to the current position; and
    wherein:
        determining the matched edge includes calculating the edge score based on a difference of an edge heading of the matched edge and the device heading.

11. A navigation system comprising:
    a storage unit including memory and configured to provide access to software;
    a control unit including at least one processor, coupled to the storage unit, configured to execute the software to:
        receive a current position for locating a device;
        add a new edge from a road topology map to a topological tree based on an edge of the road topology map corresponding to the current position, wherein:
            the road topology map is for representing segments of real-world vehicle pathways,
            the topological tree is for dynamically representing a set of edges in the road topology map corresponding to the current position;
        remove an old edge outside of a termination condition with no descendant edges within the termination condition from the topological tree based on the current position;
        determine a matched edge of the topological tree based on the current position and the topological tree; and
        calculate an adjusted location based on the matched edge for mapping the current position to the adjusted location on the matched edge.

12. The system as claimed in claim 11 wherein the control unit is configured to further execute the software to remove the old edge based on a locator error range.

13. The system as claimed in claim 11 wherein the control unit is configured to further execute the software to add the new edge based on a density of edges in the road topology map near the current position.

14. The system as claimed in claim 11 wherein the control unit is configured to further execute the software to:
    determine a device speed at the current position; and
    add the new edge more frequently when the device speed changes compared to when the device speed has not changed.

15. The system as claimed in claim 11 wherein the control unit is configured to further execute the software to:
    generate a travel route based on the adjusted location when a locator signal strength is low; and
    display the travel route on the first device.

16. The system as claimed in claim 11 wherein the control unit is configured to further execute the software to add the new edge having shape points.

17. The system as claimed in claim 16 wherein the control unit is configured to further execute the software to:
    determine a device speed at the current position; and determine whether the matched edge is reachable within a time difference from a last matched edge given the device speed.

18. The system as claimed in claim 16 wherein the control unit is configured to further execute the software to determine whether the matched edge is a child edge, a sibling edge, or a grandchild edge of the last matched edge.

19. The system as claimed in claim 16 wherein the control unit is configured to further execute the software to calculate an edge score for the matched edge based on the distance between the current position and the matched edge.

20. The system as claimed in claim 16 wherein the control unit is configured to further execute the software to:
   determine a device heading corresponding to the current position; and
   calculate the edge score based on a difference of an edge heading of the matched edge and the device heading.

* * * * *